United States Patent Office 3,839,502
Patented Oct. 1, 1974

---

3,839,502
GRAFTED POLYACRYLONITRILE AND MODACRYLONITRILE FILAMENTS AND FIBERS AND PROCESS FOR THEIR MANUFACTURE
Walter Fester, Konigstein, Taunus, Ernst-August Albers, Bad Soden, Taunus, Germany, assignors to Farbwerke Hoechst Aktiengesellschaft vormals Meister Lucius & Bruning, Frankfurt am Main, Germany
No Drawing. Filed Oct. 24, 1972, Ser. No. 299,851
Claims priority, application Germany, Oct. 27, 1971,
P 21 53 478.1
Int. Cl. C08f 29/56
U.S. Cl. 260—881         9 Claims

ABSTRACT OF THE DISCLOSURE

The invention relates to grafted polyacrylonitrile or modacrylonitrile filaments and fibers and a process for their manufacture which comprises the use of linear acrylonitrile or modacrylonitrile copolymers containing besides acrylonitrile units also azetidinone units of the formula (I)

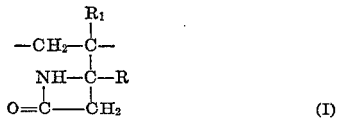

in the chain, where R and $R_1$ are H or $CH_3$, as basis polymers of the filaments and fibers, and the use of organic compounds containing at least one acid group in the molecule capable of forming amide as graft substances, and the graft of these compounds on the basis polymers by means of a heat treatment at temperatures of at least about 100° C.

Depending on the choice of the organic graft compounds, the grafted filaments and fibers may distinguish themselves by permanent antistatic behavior, reduced flammability and/or anti-soil properties.

---

The present invention relates to grafted polyacrylonitrile and modacrylonitrile filaments and fibers and a process for their manufacture.

Filaments and fibers of linear polyacrylonitrile and of linear copolymers of acrylonitrile possess a number of excellent textile properties. Depending on the application, however, drawbacks of these fibers are also known, for example insufficient hydrophilic properties, too high electrostatic charge, flammability and/or too much oleophilic affinity. It has been tried to improve filaments and fibers from acrylonitrile copolymers by grafting them with differently structured polymers by means of high-energy irradiation. However, in such an irradiation process, the polymer is easily affected, showing a yellow color. Furthermore, it is known how to provide reactive spots in the chain molecules by reaction of suitable copolymers, on which spots subsequently a graft of molecules of different nature is possible.

There have been already proposed acrylonitrile copolymers which, besides the acrylonitrile units, contain also azetidinone units of the formula (I)

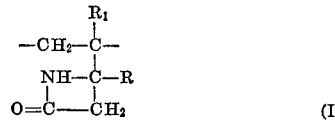

in the polymer chain, in which formula R and $R_1$ are H or $CH_3$. By heating these polymers to 130° to 150° C. in saturated steam, corresponding acrylonitrile copolymers can be cross-linked in a transamidation reaction in the presence of acidic cross-linking catalysts.

It has now been found that the cross-linking reaction can be replaced by a graft reaction. When acrylonitrile copolymers containing azetidinone units of formula (I) are heated to a temperature above 100° C. in the presence of organic compounds having at least one acid group in the molecule which is capable of forming amide, and in the absence of acidic catalysts, a graft of these organic compounds on the basic chain of the polymer occurs. When a polymer or oligomer having acid groups in the molecule is chosen as graft component, filaments or fibers of acrylonitrile-vinylazetidinone copolymers having grafted side chains can be obtained, thus imparting additional special properties to the filaments or fibers. Filaments or fibers made from acrylonitrile-azetidinone copolymers grafted by polymers or oligomers have a chemical structure according to the formula (II)

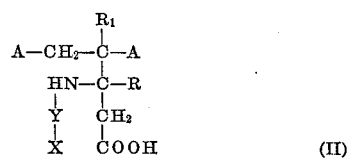

in which R and $R_1$ are H or $CH_3$, A represents the basis chains of the acrylonitrile or modacrylonitrile polymer, Y is an acid radical, for example —CO— or —$SO_2$—, and X the radical of a polymer or oligomer.

The filaments and fibers made from grafted acrylonitrile or modacryl polymers according to the present invention are manufactured by adding the organic graft compound, preferably a polymer or oligomer having acid groups, to the spinning solution or advantageously by applying it to the spun filaments and by linking it to the basis polymer by a subsequent thermal treatment of the spun filaments. This reaction may advantageously by carried out during the setting in saturated steam or hot water, as already described in German Offenlegungsschrift No. 2,021,555.

The filaments and fibers of the invention are made from polyacrylonitrile or modacrylonitrile copolymers on the basis chain of which an organic compound, preferably a second homo- or copolymer, is grafted via an acid group.

By polyacrylonitrile copolymers there are to be understood copolymers of acrylonitrile containing at least 85% of acrylonitrile and up to 15% by weight, relative to the polymer, of 4-vinylazetidinones and other comonomers, for example acrylic acid methyl or ethyl ester, methacrylic acid methyl or ethyl ester, crotonic acid methyl or ethyl ester, maleic acid dimethyl or diethyl ester, allylsulfonic acid or the sodium or potassium salts thereof, methallylsulfonic acid, sodium or potassium methallyl sulfonate, styrenesulfonic acid or the sodium or potassium salt thereof, vinyl acetate, vinyl chloride, vinylidene chloride, vinylidene cyanide, methyl-vinylketone, acrylamide, N-tert.-butyl-acrylamide, α-chloroacrylonitrile, acrylic acid dimethylamino-ethyl ester and/or vinyl pyridine.

By modacrylonitrile polymers there are to be understood polymers containing at least 35% of acrylonitrile and up to 65% by weight of 4-vinylacetidinones and other usual comonomers, of which examples are listed above.

For grafting polymer side chains, there are suitable those polymers, copolymers or oligomers which contain free acid groups, for example carboxyl, sulfonic or phosphoric acid groups. Such suitable compounds may be obtained for example by corresponding copolymerization or by a polymer-analogous reaction. Suitable polymers or oligomers are for example polyacrylic or polymethacrylic, acid, copolymers of vinyl or vinylidene chloride with acrylic acid, or methacrylic acid, copolymers of polytetrafluorethylene with acrylic acid, polystyrenesulfonic acid or carboxylic or sulfonic acids etherified with polyglycols. The graft polymers are generally linked to the basis chain of the polyacrylonitrile copolymer by the transamidation reaction with the azetidinone ring at a temperature above 100° C., and this is advantageously carried out while setting the fibers, especially in saturated steam of from 130° to 150° C.

The graft compounds and the basis polymers may be mixed either by addition of the graft compound to the spinning solution or, in a preferred embodiment of the invention, by application of the graft polymer to the spun fiber in a liquid or dissolved form.

Depending on the graft polymer used, the filaments and fibers of the invention possess different properties. Thus, when polyacrylic acid, especially substances partially neutralized by metal bases, are used, a permanent antistatic behavior of the fibers can be achieved. When copolymers of vinylidene chloride and acrylic acid are employed, the flammability of the fibers is reduced, or when fluorine containing compounds in copolymers, for example with acrylic acid, are applied, a soil repellent effect may be attained. Of course, the different properties may be combined by mixing the corresponding graft polymers. By choosing suitable organic compounds which must contain at least one acid group capable of forming amide it is possible to adapt the properties of the acrylonitrile copolymer fibers exactly to the desired applications.

Especially favourable reaction conditions for the graft are obtained when basis polymers containing from 10 to 25% by weight, relative to the basis polymer, of 4-vinylazetidinones are employed.

When the graft compounds, preferably the graft polymers, are linked to the basis chain by a thermal treatment of the fibers, also an additional cross-linking of the basis chain according to German Offenlegungsschrift No. 2,021,555 may occur under a sufficiently prolonged influence of heat at correspondingly high temperatures, so that in this case the filaments or fibers of the invention possess additionally an increased modulus in hot water.

The following examples illustrate the invention.

EXAMPLE 1

A copolymer containing 80% of acrylonitrile and 20% of 4-vinylazetidinone-2 was prepared by a continuous suspension-precipitation polymerization, using the catalyst system $K_2S_2O_8/Na_2S_2O_5$ and an iron(II) salt as cocatalyst. Relative to the total monomers, 0.25% of $K_2S_2O_8$ and 1% of $Na_2S_2O_5$ were used and a K value according to Fikentscher of 84 was adjusted. The polymerization was carried out at 55° C. and a pH of 3. The polymer obtained was washed, dried and subsequently wet spun from a 23% solution in dimethyl formamide into a coagulation bath containing 65% of dimethyl formamide and 35% of water. After washing and drying, the filaments were impregnated with an aqueous solution containing 10% of polyacrylic acid, 50% of which had been neutralized by means of NaOH. The filaments were dried and subsequently steamed for 30 minutes at 140° C.

The filaments so obtained were tested for their electrostatic properties by measuring their electric resistance. In order to have a comparison with a commercial polyacrylonitrile, a polymer containing 95% of acrylonitrile and 5% of acrylic acid methyl ester was processed to filaments in an analogous manner and impregnated with the same solution as above. The electric resistance of these filaments was determined before and after a gentle washing. The following results were obtained:

| | Electric resistance (in Ω) | |
|---|---|---|
| | Before washing | After washing |
| Fiber according to the invention | $9.0 \times 10^8$ | $8.8 \times 10^9$ |
| Comparative fiber | $9.1 \times 10^8$ | $4.7 \times 10^{11}$ |

The resistance was measured at 23° C. and a relative atmospheric humidity of 47% on 100 filaments having a titer of dtex 123 f 51. The filaments were wound on two gilded brass electrodes and the resistance was measured between these electrodes.

A fiber without any treatment whatsoever has an electric resistance of $1 \times 10^{12} \Omega$.

The table shows clearly that the electrostatic properties of the fibers modified with 4-vinylazetidinone-2 and grafted with polyacrylic acid are considerably improved also after washing.

EXAMPLE 2

Fibers were manufactured according to Example 1, the impregnation however being carried out using a 10% aqueous polyacrylic acid solution, 80% of which having been neutralized with NaOH. Before washing, the fibers had an electric resistance (measured as indicated in Example 1) of $1.0 \times 10^8 \Omega$ and of $6.0 \times 10^8 \Omega$ after washing. This means that, even at a further neutralization of the polyacrylic acid, this acid was still grafted and that, on account of the higher ion concentration, it furnishes a further improvement of the electrostatic properties.

EXAMPLE 3

The copolymer according to Example 1 was dissolved in dimethyl formamide so that a 25% solution was obtained. This spinning solution was extruded, at about 100° C., through a nozzle having 18 holes into a dry spinning chamber, into which air of about 220° C. was blown. The filaments obtained having a residual content of about 10% of dimethyl formamide were wound up, subsequently drawn in hot water and then washed with water in order to remove the remaining solvent. They were impregnated with a 10% aqueous solution of a fatty alcohol-polyglycol ether-oxycarboxylic acid, and set as indicated in Example 1.

The fatty alcohol-polyglycol ether-oxycarboxylic acid of this Example was obtained in the following reactions: a coconut fatty alcohol oxethylate, obtained by reaction of coconut fatty alcohols with 5 moles of ethylene oxide (Genapol C 050), was converted to the sodium alcoholate by addition of sodium. By reaction of this compound with the sodium salt of chloroacetic acid and subsequent acidification, the desired compound was obtained.

The resistance of the fibers so grafted was $1.2 \times 10^8 \Omega$ before and $1.1 \times 10^9 \Omega$ after washing.

EXAMPLE 4

A spinning solution according to Example 3 was prepared, to which however 10%, relative to the polymer used, of the polyether acid indicated in Example 3 were added. The further processing was as in Example 3, without however the subsequent additional impregnation. The filaments obtained had a resistance of $5 \times 10^8 \Omega$ before and of $4 \times 10^9 \Omega$ after washing.

EXAMPLE 5

According to Example 1, filaments were manufactured from a copolymer containing 20% of 4-vinylazetidinone-2 and 80% of acrylonitrile, which filaments were impregnated with a 10% solution of a polymer of 50% of vinylidene chloride and 50% of acrylic acid in tetrahydrofuran, and then heated as indicated in Example 1 for the graft of the polymer.

The polymer of vinylidene chloride and acrylic acid was prepared as follows:

To a solution of:
  30 ml. of distilled water
  120 ml. of methanol
  1.12 g. of sodium acetate$\times 3H_2O$
  0.25 g. of potassium peroxy-disulfate
  1.00 g. of sodium disulfite
  0.0032 g. of $[(NH_4)_2Fe](SO_4)_2 \cdot 6H_2O$ the following solutions were added dropwise, while thoroughly stirring, within one hour at 30° C.:

1. a mixture of 60 g. of acrylic acid and 60 g. of vinylidene chloride,
2. 0.250 g. of potassium peroxy-disulfate dissolved in a mixture of 50 ml. of distilled water and 10 ml. of methanol,
3. 1.00 g. of sodium disulfite dissolved in a mixture of 50 ml. of distilled water and 10 ml. of methanol.

After 3 hours, the polymer which had formed was filtered off, washed with water and methanol and dried at 60° C. and 200 mm. Hg. 86 g. of polymer containing 30% by weight of chlorine were obtained. The fibers modified with this polymer gave a considerable protection against inflammation, in contrast to unmodified fibers. In a comparative test on a semi-circle tester according to DIN 54 331, the fibers manufactured according to this Example were burned up to only 90°, while an unmodified comparative fiber was burned over the complete 180° C.

EXAMPLE 6

A spinning solution according to Example 1 containing a copolymer of 80% of acrylonitrile and 20% of 4-vinylazetidinone-2 was prepared, to which 10%, relative to the polymer used, of a copolymer of 50% of vinylidene chloride and 50% of acrylic acid according to Example 5 was added. This solution was spun according to Example 1. The filaments obtained were impregnated only with water for further processing, the subsequent thermal treatment for the copolymer graft was carried out as indicated in Example 1. The filaments obtained behaved at burning in a similar manner as those of Example 5.

What is claimed is:

1. A process for the manufacturing of acrylonitrile/unsaturated azetidinone copolymers having grafted side chains which comprises heating to a temperature above 100° C. a copolymer containing at least 35% linear acrylonitrile and azetidinone units of the formula (I)

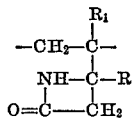

where R and $R_1$ are H or $CH_3$, in the presence of an organic compound containing at least one acid group in the molecule capable of forming amide, thereby grafting said organic compounds onto said copolymer.

2. Process as claimed in claim 1 wherein said copolymer contains about 10 to 25% by weight of azetidinone units of the formula (I) in the chain, and the graft is carried out by setting in saturated steam or hot water at about 130° to 150° C.

3. Process as claimed in claim 1 wherein said organic compounds are added to a spinning solution of copolymer and thereafter filaments are spun from said solution and the graft reaction is carried out by a heat treatment of the spun filaments.

4. Process as claimed in claim 1 wherein the graft compounds are applied to spun filaments or fibers made from the acrylonitrile/unsaturated azetidinone copolymer, and the graft reaction is carried out by a subsequent heat treatment.

5. Process as claimed in claim 1 wherein said organic compounds are polymers or oligomers containing at least one acid group capable of forming amide.

6. Process as claimed in claim 5 wherein said polymers or oligomers are selected from the group consisting of (A) homopolymers of acrylic acid or methacrylic acid or copolymers of these compounds with vinyl chloride, vinylidene chloride or tetrafluorethylene compounds, (B) polystyrenesulfonic acid and (C) oxycarboxylic acids etherified with polyglycols, or the corresponding compounds partially neutralized by metal hydroxides.

7. Linear acrylonitrile polymers having in the main chain thereof at least 35% by weight of acrylonitrile units, and units of the general formula:

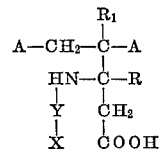

wherein R and $R_1$ are H or $CH_3$, A represents portions of the acrylonitrile polymer chain, Y is an acid radical selected from —CO— and —$SO_2$— and X is the radical of an organic polymer or oligomer.

8. Polymers according to claim 7 wherein X is selected from radicals of (A) homopolymers of acrylic acid or methacrylic acid or copolymers of these compounds with vinyl chloride, vinylidene chloride or tetrafluoroethylene compounds, (B) polystyrenesulfonic acid and (C) oxycarboxylic acids etherified with polyglycols, or the corresponding radicals partially neutralized by metal hydroxides.

9. Filaments and fibers made from the polymers of claim 7.

References Cited

UNITED STATES PATENTS 3,236,914   2/1966   Murdock et al. _____ 260—857

FOREIGN PATENTS 1,805,045   9/1970   Germany.

PAUL LIEBERMAN, Primary Examiner

C. SECCURO, Assistant Examiner

U.S. Cl. X.R.

260—85.5 S, 85.5 B, 898, DIG 24